(12) United States Patent
Kerr, Sr.

(10) Patent No.: US 7,672,947 B2
(45) Date of Patent: Mar. 2, 2010

(54) ASSET ATTACHMENT DEVICE

(75) Inventor: James H. Kerr, Sr., 5432 Chatterbird Pl., Columbia, MD (US) 21045

(73) Assignee: James H. Kerr, Sr., Columbia, MD (US)

( * ) Notice: Subject to any disclaimer, the term of this patent is extended or adjusted under 35 U.S.C. 154(b) by 551 days.

(21) Appl. No.: 10/025,773

(22) Filed: Dec. 26, 2001

(65) Prior Publication Data

US 2002/0152223 A1 Oct. 17, 2002

Related U.S. Application Data

(60) Provisional application No. 60/257,233, filed on Dec. 22, 2000.

(51) Int. Cl.
*G06F 17/00* (2006.01)
(52) U.S. Cl. ............... 707/10; 707/102; 707/104.1; 707/101; 707/103 Y
(58) Field of Classification Search .......... 707/10, 707/203, 205, 104.1, 3, 101, 102, 103 Y; 705/2, 28; 701/35; 340/5.31, 10.1, 539.11, 340/539.16, 539, 870.09, 71, 573.4, 568.7; 364/424.01; 342/357.07, 457; 455/414.2, 455/403, 456; 726/9; 709/224, 203, 225; 710/18, 52
See application file for complete search history.

(56) References Cited

U.S. PATENT DOCUMENTS

| | | | | |
|---|---|---|---|---|
| 5,525,969 A * | 6/1996 | LaDue | ...... | 340/573.4 |
| 5,588,038 A * | 12/1996 | Snyder | ...... | 340/7.1 |
| 5,628,029 A * | 5/1997 | Evoy | ...... | 710/18 |
| 5,644,725 A * | 7/1997 | Schmerer | ...... | 705/28 |
| 5,715,665 A * | 2/1998 | Diekhans et al. | ...... | 56/10.2 F |
| 5,786,998 A * | 7/1998 | Neeson et al. | ...... | 701/35 |
| 6,154,796 A * | 11/2000 | Kuo et al. | ...... | 710/52 |
| 6,243,039 B1 * | 6/2001 | Elliot | ...... | 342/457 |
| 6,269,401 B1 * | 7/2001 | Fletcher et al. | ...... | 709/224 |
| 6,321,091 B1 * | 11/2001 | Holland | ...... | 455/414.2 |
| 6,344,794 B1 * | 2/2002 | Ulrich et al. | ...... | 340/539.16 |
| 6,388,612 B1 * | 5/2002 | Neher | ...... | 342/357.07 |
| 6,400,270 B1 * | 6/2002 | Person | ...... | 340/568.7 |
| 6,459,371 B1 * | 10/2002 | Pike | ...... | 340/539.1 |
| 6,510,450 B1 * | 1/2003 | Ricart et al. | ...... | 709/203 |
| 6,657,535 B1 * | 12/2003 | Magbie et al. | ...... | 340/5.31 |
| 6,828,907 B1 * | 12/2004 | Galle | ...... | 340/539.11 |

(Continued)

FOREIGN PATENT DOCUMENTS

WO     WO 99/50734     * 10/1999

OTHER PUBLICATIONS

Tim Bass, "Intrusion detection systems and multisensor data fusion", ACM, Sep. 2000, pp. 99-105.*

*Primary Examiner*—Thuy N Pardo
(74) *Attorney, Agent, or Firm*—Dickstein Shapiro LLP

(57) ABSTRACT

The present invention performs asset management by giving the user asset information on a regular basis. The customer communicates with a central server via means such has telephone and the world wide web. The central server houses the application specific software to enable the user to manage assets. The central server communicates with the asset attachment device via means such as telephone and the world wide web. When a user accesses the system, the system sends back asset information such as the asset ID, location and status.

18 Claims, 11 Drawing Sheets

U.S. PATENT DOCUMENTS

| | | | |
|---|---|---|---|
| 6,961,555 B1* | 11/2005 | Philyaw | 455/403 |
| 7,240,364 B1* | 7/2007 | Branscomb et al. | 726/9 |
| 7,392,312 B1* | 6/2008 | Philyaw | 709/225 |
| 2001/0044310 A1* | 11/2001 | Lincke | 455/456 |
| 2002/0029176 A1* | 3/2002 | Carlson et al. | 705/28 |
| 2002/0063636 A1* | 5/2002 | Whitmore et al. | 340/870.09 |
| 2002/0084889 A1* | 7/2002 | Bolavage et al. | 340/10.1 |
| 2002/0128864 A1* | 9/2002 | Maus et al. | 705/2 |
| 2004/0107217 A1* | 6/2004 | Hastings | 707/104.1 |

\* cited by examiner

| STANDARD REPORT |||||||
|---|---|---|---|---|---|---|
| Site Location ||| | Status ||||
| | | | Red | Yellow | Green |
| Date | Time | SN | Not Verified | Caution | Verified |
| 11-26-01 | 01:00 | xxxxxx | | ✓ | |
| 11-26-01 | 12:00 | xyzabc | | | ✓ |
| 11-26-01 | 15:00 | 123456 | ✓ | | |
| 11-26-01 | 21:00 | A2C7D9 | | ✓ | |

Figure 2

ASSET ATTACHMENT DEVICE

This application claims benefit of Provisional Application Ser. No. 60/257,233 filed Dec. 22, 2000.

FIELD OF THE INVENTION

The present invention relates to inventory devices used with physical assets. Specifically, the present invention relates to electronic inventory locator devices and a method of locating and tracking inventory.

BACKGROUND OF THE INVENTION

Inventory locator devices are traditionally used to assist in inventory control, manufacturing plant process control, safety inspection and inventory security. Inventory locator devices typically were printed tags or bar-coded tags. These inventory locator systems suffered from problems associated with misreading of the information by a human reader, incorrect entry of information by a human or damage associated with exposing the tags to harsh environmental conditions. Electronic inventory locator devices are used to eliminate these problems.

SUMMARY OF THE INVENTION

The asset attachment device of the present invention may be, for example, a small microcontroller based Radio Frequency (RF) device capable of performing two-way communicate with other system RF devices that are within its communication range. The device may be attached to various physical assets and may be repeatedly used to assist in asset identification or to track assets. The RF communication devices and protocols are in compliance with FCC regulations as they apply to office and industrial environments.

BRIEF DESCRIPTION OF THE DRAWINGS

FIG. 2 is an illustration of the report generated by the system of present invention.

DETAILED DESCRIPTION OF THE INVENTION

The present invention defines a method and system for economically and rapidly identifying, locating and indicating the status of physical assets or property items. The system is capable of communicating in a remote non-contact manner with the physical asset by use of existing commercial telephone systems. The invention utilizes one or more rapid frequency transmitter devices, one or more radio frequency receiver devices, one or more radio frequency signal converters and one or more central processing units to facilitate processing of information such as the location and status of a physical asset.

The present invention will now be described more fully hereinafter with reference to the accompanying drawings in which preferred embodiments are shown. This invention, however, may be embodied in many different forms and should not be construed as limited to the illustrated embodiments set forth.

As stated above, an exemplary embodiment of the asset attachment device of the present invention makes use of a plurality of radio frequency transmitter devices/receiver devices. The devices are preferably powered by a battery. The device preferably operates in the broadband range of 2.4 GHz-5.0 GHz.

Figure 1:
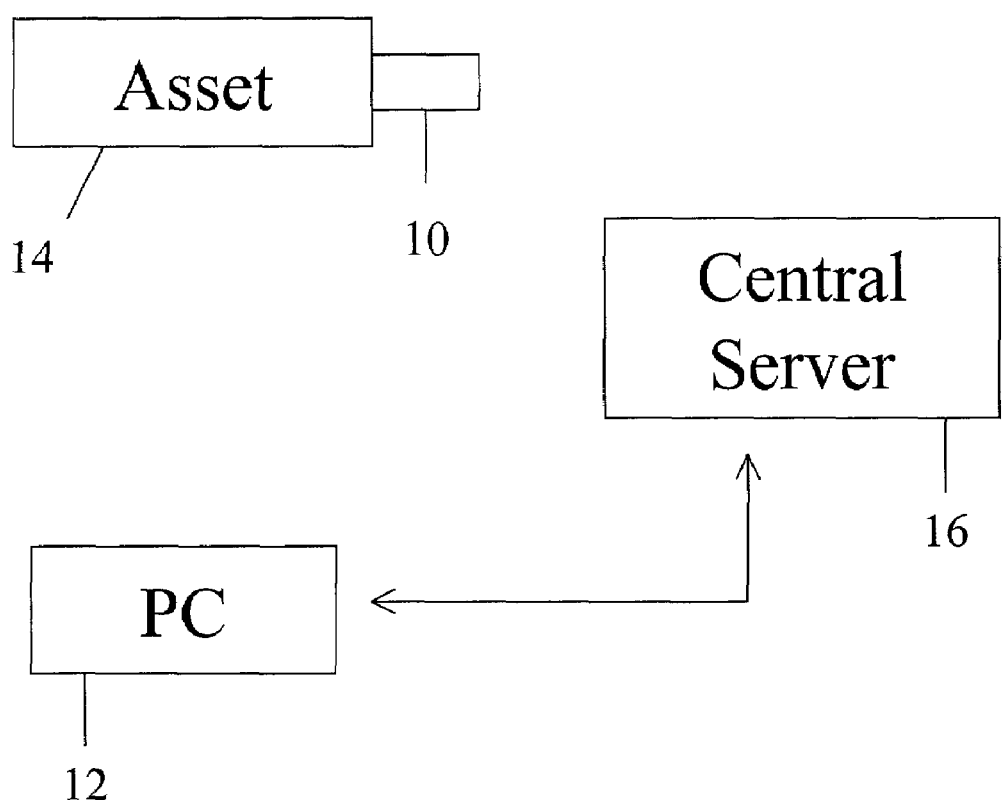
FIG. 1 is a basic block diagram of the system of the system of the present invention.

Referring to FIG. 1, the system operates as follows. The asset attachment device 10 is placed in contact with a physical asset 14. Using a device such as a personal computer 12 located remotely from the physical asset 14, information relevant to the physical asset 14 is stored in a database. Each database user may be granted exclusive access rights to secured data unique to the user only such as a password or personal identification number to gain access to the system. By use of the personal computer 12, information is requested regarding one or more physical assets from a central server 16. The central server 16 communicates with the physical asset 14 via communication means such as telephone or the internet. The central server 16 interrogates the asset attached 10 attached device to the physical asset 14 by transmitting a signal. The central server 16 computes the status and location of the physical asset 14 by interrogating the signal received from the physical asset 14 and displays the physical asset 14 status. For example, a red status signal indicates that the physical asset 14 is missing from the physical asset's intended location. A yellow status signal indicates that the physical asset 14 is located at a particular location, other than the intended location. A green status signal indicates that the physical asset 14 is located exactly where it should be located.

The status signal information is stored at the central server 16. The user may access the information stored at the central server 16 during any selected time period 365 days/year and 24 hours each day. The system will compute the status and historical pattern of the physical asset 14. The user has access to a series of predetermined reports such as illustrated in FIG. 2.

Preferably, the asset attachment device 10 transmits up to approximately 1000 feet with minimal signal interference problems. However, the asset attachment device 10 may be configured to conform to the distance required by the user of the system.

The central server 16 may be configured to communicate with the asset attachment device 10 at any interval selected by the user.

Figure 3:
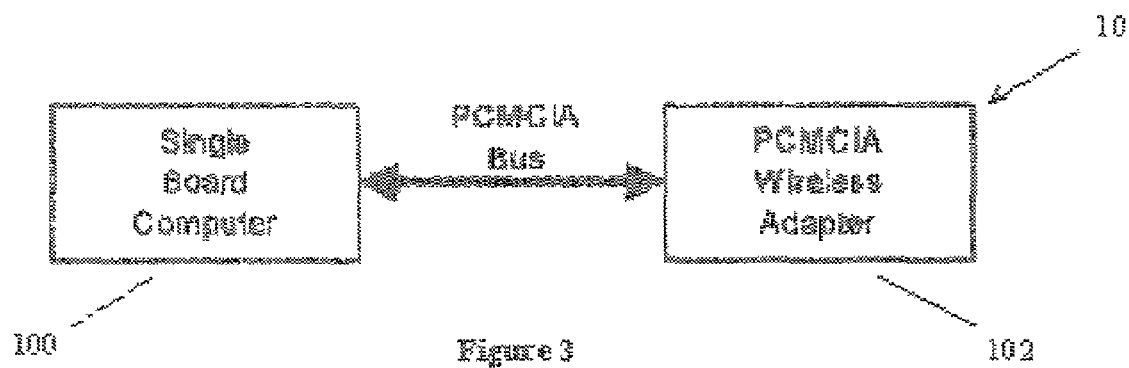
FIG. 3 is a block diagram of one embodiment of the asset attachment device of the present invention.

The asset attachment device 10, in one embodiment, may be based, for example, on a single board computer 100 (SBC) connected to a wireless network adapter 102 via a Personal Computer Memory Card International Association (PCMCIA) I/O interface bus as shown in FIG. 3.

Single Board Computer Requirements Definition
The minimum requirements of the SBC 100:
80X86 Compatible Embedded CPU 100 MHz Clock Speed
12 Megabytes On-Board FLASH Memory
16 Megabytes On-Board RAM
PCMCIA Card Interface
Real Time Clock and Timers
CPU Interrupt Capabilities
User I/O Expansion Bus
On-Board Power Supply The wireless network adapter 102 may be, for example, a high-speed Ethernet wireless network adapter or equivalent communication device compliant with the PCMCIA Type II I/O interface specification and the IEEE 802.11b networking standard for wireless connections. These requirements insure that the adapter will function properly when connected to a compliant SBC and that the adapter will operate properly in a multi-vendor wireless network environment. The adapter operates in a 2.4 GHz Direct Sequence Spread Spectrum (DSSS) environment and has the capability to operate at bandwidth data transmission rates of 11 Mbps, 5.5 Mbps, 2 Mbps or 1 Mbps. The device has the capability to be manually set to these transmission rates as well as the capability to dynamically self configure to these rates via auto sensing. The adapter has the capability to operate in a point-to-point mode to connect to other adapters as well as an Infrastructure mode to connect to a wireless network access point. The range of coverage per cell is at least 100 meters indoors and 300 meters per cell outdoors. The adapter is compatible with Windows™ operating systems or equivalent operating systems.

Figure 4:
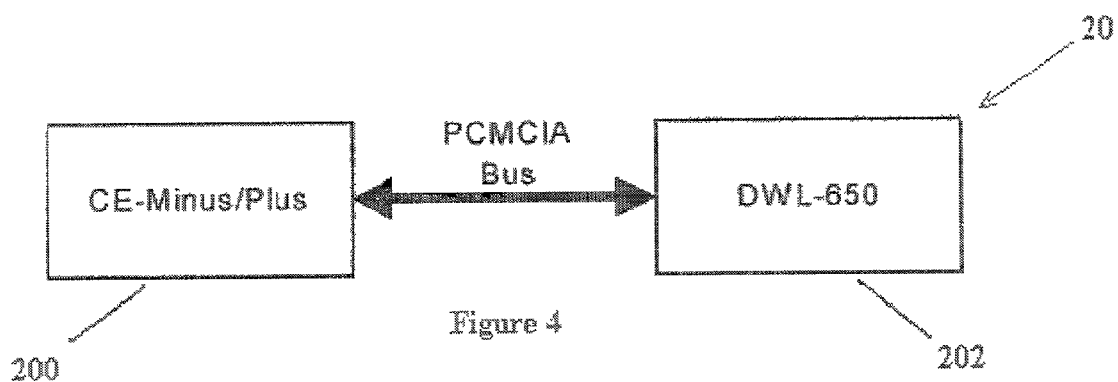
FIG. 4 is a block diagram illustrating a hardware configuration according to an embodiment of the present invention.
Figure 5:
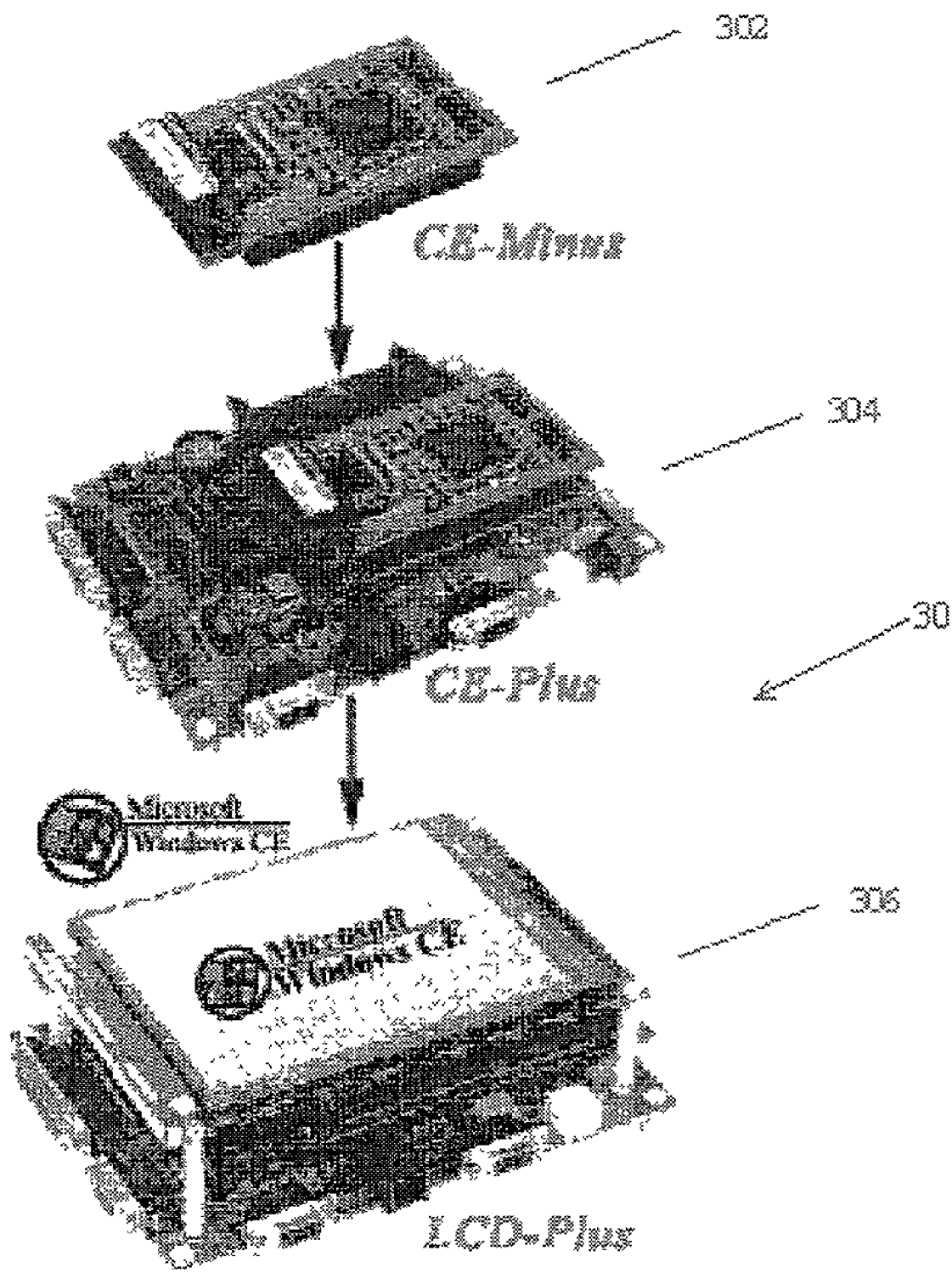
FIG. 5 is a hardware configuration according to an embodiment of the present invention.

In another embodiment, the asset attachment device 20 is designed based on an R. L. C. Enterprise, Inc CE-Minus/Plus™ Single Board Computer system 200 connected to a D-Link DWL-650 PCMCIA wireless network adapter 202, as shown in FIG. 4. Although this design is exemplified, any equivalent design having similar features/functions may be utilized. The CE-Minus/Plus™ 200 is a Windows™ CE based, 32-Bit Embedded Single Board Computer capable of running applications written in Microsoft™ Embedded Visual C++ or Visual Basic. The key hardware features include an AMD ELAN SC400™ 486 compatible CPU/Controller, RAM and Flash memory, Solid State Disk, real Time Clock, Serial Ports, Parallel Printer Port, LCD Color Graphics LCD, Touch Screen, PCMCIA Interface, Digital Parallel I/O and Analog Inputs. The CE-Minus/Plus consists of the following three major hardware components: (1) CE-Minus SC400 302, (2) CE-Plus I/O Expansion Board 304 and (3) LCD-Plus 306 LCD color graphics display as shown in FIG. 5. A brief description of each component and some of their key functions is provided below.

Figure 6:
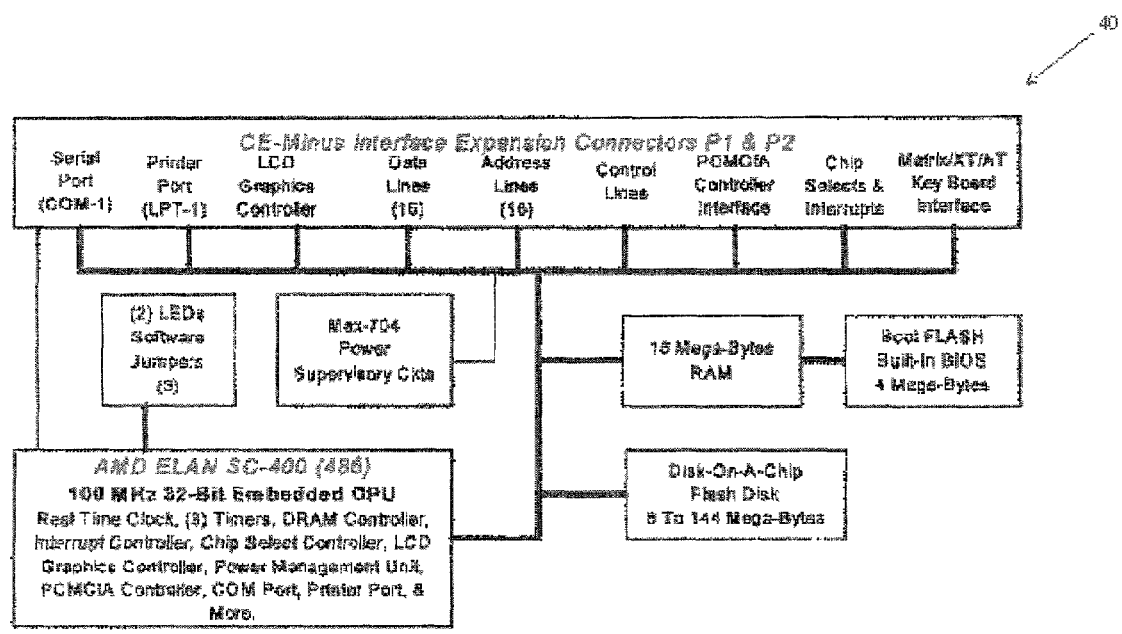
FIG. 6 is a further illustration of the hardware configuration of FIG. 5

As illustrated in FIG. 6, the CE-Minus-SC400™ 302 is a SBC on a credit card sized board. The circuit card, which measures approximately 2.5"×4.5", contains an AMD™ ELAN SC400 CPU/Engine and three types of on-board memory. The CE-Minus 302 contains all of the functions required to support the Microsoft Windows™ CE version 3.0 or equivalent operating system.

A processor such as the AMD ELAN SC400™ microcontroller/CPU combines a 100 Mhz 32-bit, low-voltage 486 CPU with compatible peripherals, along with the power management features required for low power and battery operation. It contains fully integrated compatible peripherals which include an LCD character/graphics controller, PCMCIA controller, matrix keyboard interface, keyboard interface, two 8256A compatible programmable interrupt controllers (PICs), DRAM controller, two 8237A compatible DMA controllers, real-time clock (RTC), and an enhanced parallel printer port. The ELAN SC 400 microcontroller/CPU is targeted specifically for embedded systems. All software written for the x86 architecture family is compatible with the ELAN SC400 microcontroller/CPU.

The CE-Minus 302 provides 16 Mega-bytes of DRAM and 12 Mega-bytes of on-board FLASH memory as standard. A 32-pin socket may be used to add a Disk-On-A-Chip to expand the 12 Mega-bytes of standard on-board FLASH memory up to 148 Mega-bytes. Additional FLASH memory may also be added using ATA FLASH cards via the PCMCIA card interface. A BIOS with built-in loader and FLASH programmer is contained in a protected region of the on-board BOOT FLASH memory. The BIOS allows new versions of the operating system to be down loaded and programmed directly into the BOOT FLASH memory without the use of external EPROM programmers. Full program transfers into FLASH DISH memory using standard drag and drop is supported.

The CE-Minus 302 provides a standard 16550A UART via the ELAN-SC400 CPU. The serial interface signals are available at connectors P1 and P2. The CE-Minus 302 features a LCD character/graphics controller via the ELAN SC400 CPU/microcontroller. This on-board character and graphics controller is supported for 320×240 RGB color 4 bits pixel. Device drivers are included and have been custom integrated into Windows RLC-CE operating system. This interface is available for user integration at P1 and P2.

The parallel port provided by the CE-Minus 302 via the ELAN SC400 is functionally compatible with IBM™ PC/AT and equivalent systems or above, with and added EPP mode for faster data transfers. The parallel port interface provides all the status inputs, control outputs, and the control signals necessary for the external parallel port data buffers. This interface is available for user integration at P1 and P2.

The PCMCIA Card host bus adapter interface included on the CE-Minus via the ELAN SC400 microcontroller conforms to PCMCIA Standard Release 2.1. The interface provides support for one external card socket. This interface is available for user integration at P1 and P2.

Additional functions and features provided by the ELAN SC400 include a Real Time Clock, two 8259 compatible interrupt controllers, 8254 timer, dual 8237 DMA controller, matrix keyboard interface, and a power management unit. Many of these features are made available for user integration at P1 and P2.

The CE-Minus 302 provides address lines, data bus lines, chip selects, interrupts and control lines for interfacing to custom I/O designs. This interface is available for user integration at P1 and P2. A block diagram of the CE Minus is shown in FIGS. 6 and 6.

The CE-Plus I/O expansion board 304 interfaces directly to the CE-Minus CPU/Engine and the LCD-Plus display, expanding the on-board I/O of the CE-Minus single board CPU/Engine. The CE-Plus expansion board 304 provides the user access to all of the features of the CE-Minus plus 302 an on-board regulated power supply, data bus buffers, I/O drivers, two additional serial ports, and user interface connectors. The CE-Plus expansion board 304 also provides for additional I/O expansion via a two on-board iSBX direct plug-in I/O connectors and the RS-485 Network port. Any combination of R.L.C. iSBX I/O Modules and Network I/O Modules may be added to the system using standard interfaces. The CE-Plus expansion board 304 also provides a reset button and lithium battery for the CE-Minus Real time Clock.

Figure 7:
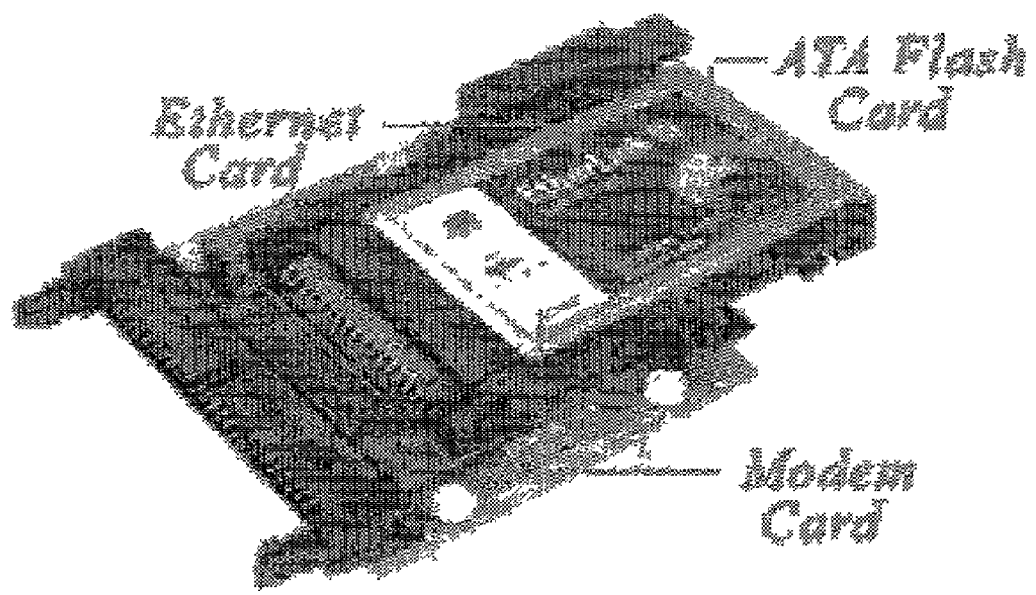
FIG. 7 is an illustration of another embodiment of the present invention.

The adapter socket illustrated in FIG. 7 allows a PCMCIA card to be added to the CE-Minus/Plus Embedded SBC, the adapter is designed to connect to the CE-Plus expansion board 304. This PCMCIA socket adapter may be used to add standard functions such as Ethernet, Modem or ATA FLASH Memory cards as shown in FIG. 6. Both full sized PCMCIA and compact sized PCMCIA cards are supported. Software drivers are provided in the Windows CE operating system to support use of many standard PCMCIA cards available. Software development using a serial or PCMCIA Ethernet link to only computer is fully supported.

The LCD-Plus features a built-in color LCD graphics display with fully integrated resistive touch screen. The display features a ¼VGA resolution, 320×240 RGB color 4 bits per pixel. The display features a wide viewing angle with CCFL back light. Power for the LCD display is generated on-board. The LCD-Plus mounts directly to the CE-Plus or can alternately be mounted up to approximately two feet away. The LCD-Plus also provides an 8×8 matrix keyboard port which provides capabilities for adding external keyboards or switch panels, The matrix keyboard port may alternately be used as (8) TTL digital inputs and (8) TTL digital outputs. A 12-bit A to D converter is used to interface the resistive touch screen to the Windows CE operating system.

Display and touch screen drivers are custom integrated into the Windows CE operating system. Because the LCD-Plus has been integrated into the Windows CE operating system, graphic/character screen displays and user touch screen input are simply done using standard Microsoft Visual basic or Visual C++ system calls. Software controls allow the contrast adjustment and applications to turn off the CCFL back light to conserve power.

Figure 8:
FIG. 8 is an illustration of a network link according to the present invention.

As shown in FIG. 8, a network interface such as the D-Link DWL-650™ is a high-speed 11 Megabits per second (Mbps) Ethernet wireless network adapter that plugs into a computer PCMCIA slot. Once connected with other networked computers, it allows you to share peripheral devices such as hard disk drives, DVD drives, CD drives, Iomega Zip drives, printers and provides shared access to a modem for Internet access.

The D-Link DWL-650 strictly adheres to the most advanced IEEE networking Standard for wireless connections, so the D-Link DWL-650 is very compatible with multi-vendor environments that also meet the standard compliance for IEEE 802.11b. The DWL-650 bandwidth data transmission rate can be set manually at 11 Mbps, 5.5 Mbps, 2 Mbps, 1 Mbps or it can be set on dynamic auto-sensing configuration.

The D-Link DWL-650 connects point-to-point or it may use an access point to extend the reach of its communications capability. The D-Link has full mobility and seamless roaming from cell to cell as well as across access points. The range of coverage per cell for indoor use is up to 100 meters and up to 300 meter per cell for outdoor use.

The D-Link DWL-650 is an IEEE 802 11b compliant PCMCIA Type-II 11 Mbps wireless LAN adapter. The DWL-650 operates in 2.4 GHz Direct Sequence Spread Spectrum (DSSS) for wireless networks in the home or office environment. The link is designed to operate in 3.3V or 5.0V DC slots. In addition, the DWL-650 uses a 40-bit WEP (Wired Equivalent Privacy) Encryption for a secure network connection.

The D-Link DWL-650 operates in either Ad-Hoc mode (Peer-to-Peer networking without access point) or Infrastructure mode (Peer-to-Peer networking using an access point). In Infrastructure mode, the DWL-650 can be connected to a broadband residential gateway or a xDSL/Cable modem for high-speed wireless Internet access on the existing network.

The DWL-650 can transmit data at 11, 5.5, 2 or 1 Mbps per channel. The DWL-650 transmit rate values may be manually selected for Auto Select 1 or 2 Mbps, Fixed 1 Mbps, Fixed 11 Mbps, Fixed 2 Mbps, Fixed 5.5 Mbps and Fully Auto. The DWL-650 has full mobility and seamless roaming from cell to cell as well as across access points. The range of coverage per cell for indoor use is approximately 100 meters and approximately 300 meters per cell for outdoor use. The DWL-650 comes with an internal non-detachable diversity patch antenna and one built-in green LED indicator for power, network link and activity. The DWL-650 is compatible with Windows 95 OSR2, 98, ME, 2000, NT 4.0 and other popular operating systems.

Software Design Overview

The embedded software application will be developed using C/C++ software programming language. The Microsoft Embedded Visual C++ Integrated Developed Environment (IDE) will be used as the software development environment. The basic functions that the application will perform are listed below:

Perform two-way communication with local wireless access points

Perform two-way communication with other Asset Attachment Devices

Perform Power Control Management

Software Development Environment

The preferred software development environment will consist of the Microsoft Windows CE 3.0 Operating System resident on the CE-Minus SBC and the Embedded Visual C++ IDE hosted on an AT compatible Computer or equivalent operating system and software development toolkit. Windows CE is a low-cost, compact real time embedded operating system from Microsoft designed for sophisticated 32-bit embedded computer solutions. Windows CE features a compact operating system that has been custom tailored by R.L.C. and ported to the CE-Minus/Plus Embedded Single Board Computer. Many of the interfaces provided by the CE-Minus/Plus have been integrated into the operating system. The OS will be pre-installed in the CE-Minus along with everything needed, except the Embedded C++ IDE, to start developing the software application.

Figure 9:
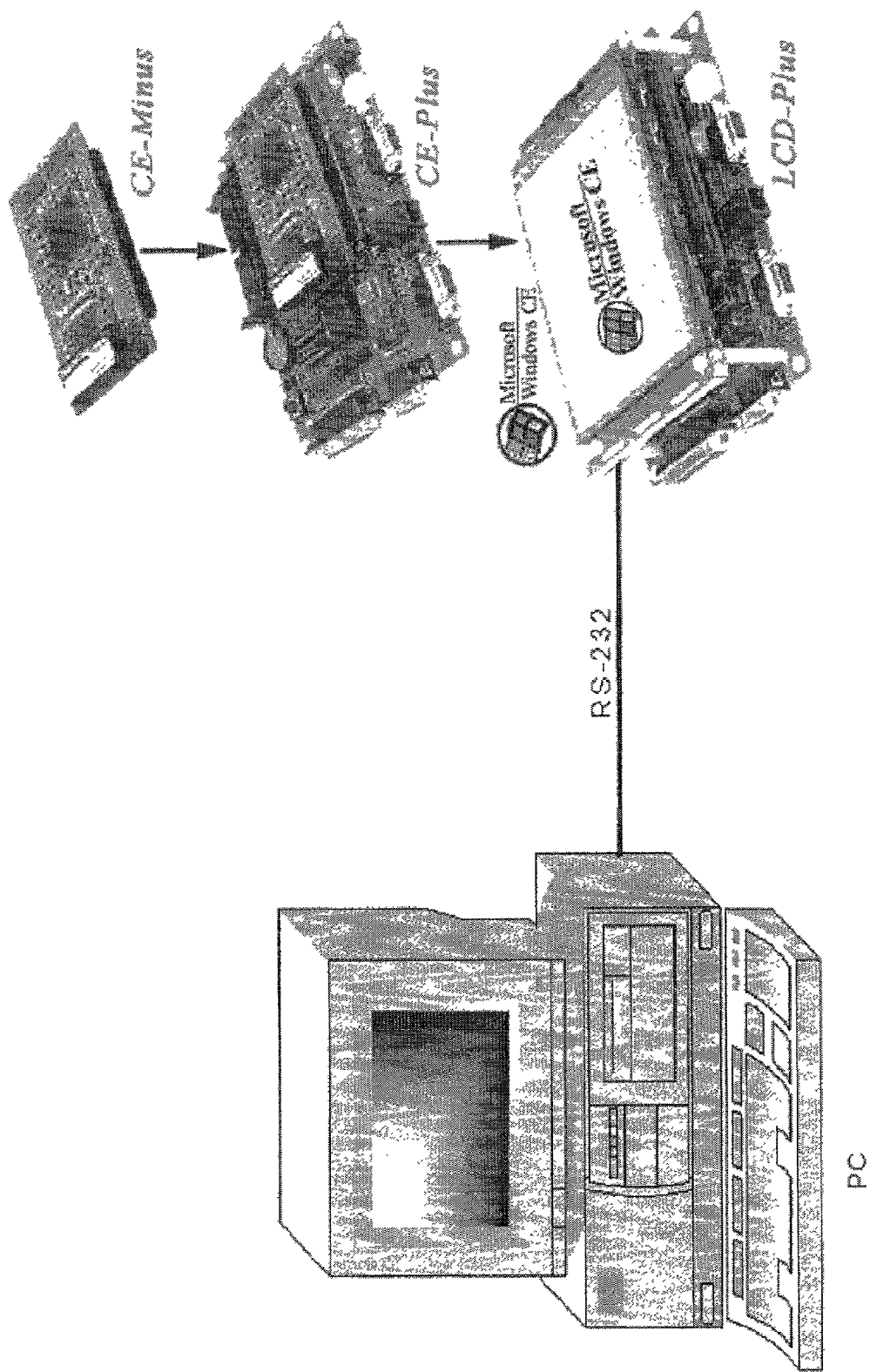
FIG. 9 is an illustration of the software development system configuration according to the present invention.

The application programs will be written using Microsoft Embedded Visual C++ and debugged using the full-featured remote debug capabilities of the IDE and WIN CE. Remote application development and debug communication will be performed via the COM-1 RS-232 communication port as shown in FIG. 9. Drivers and/or DLLs will be added as required.

Figure 10:
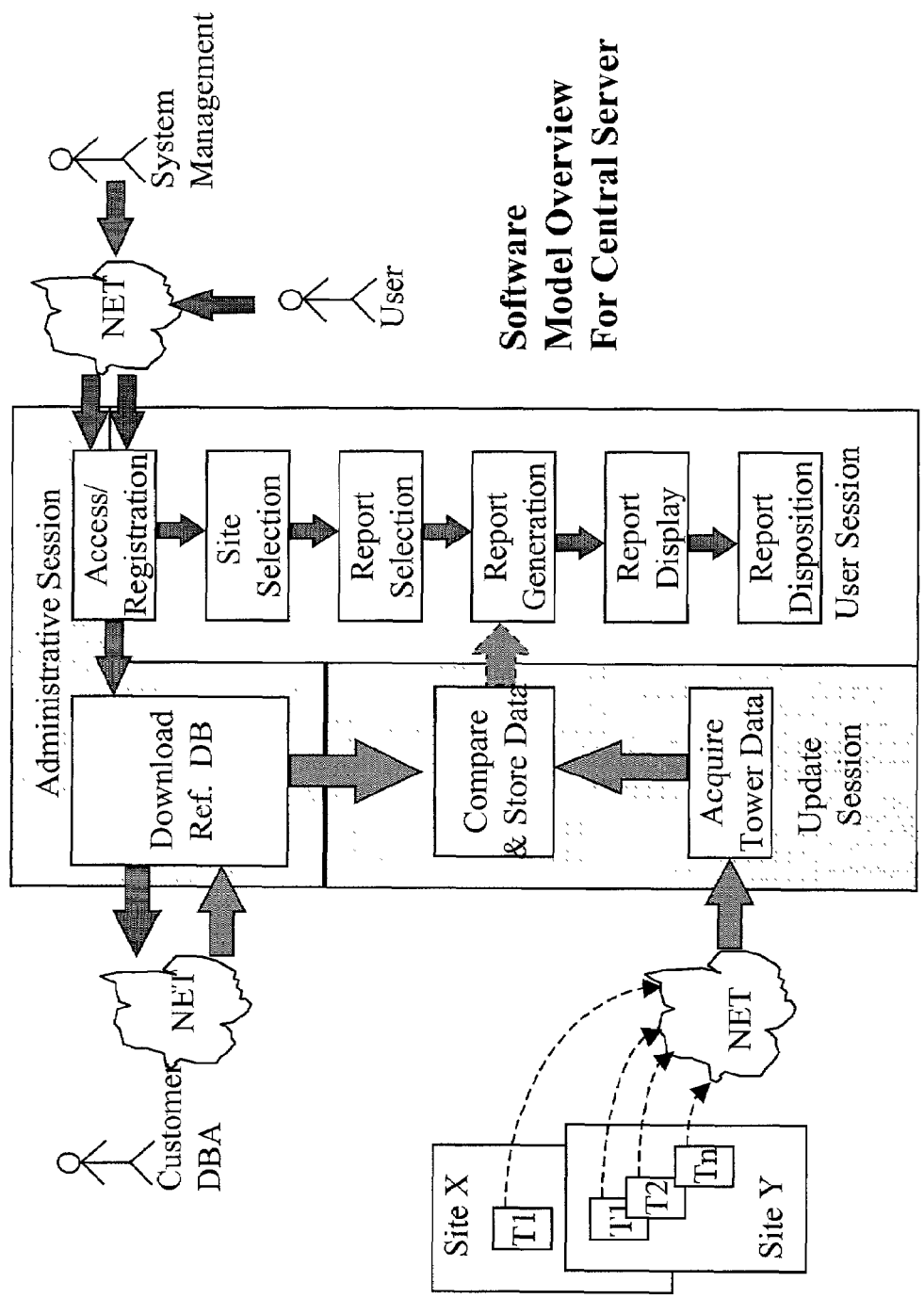
FIG. 10 illustrates the software model overview for the central server.
Figure 11:
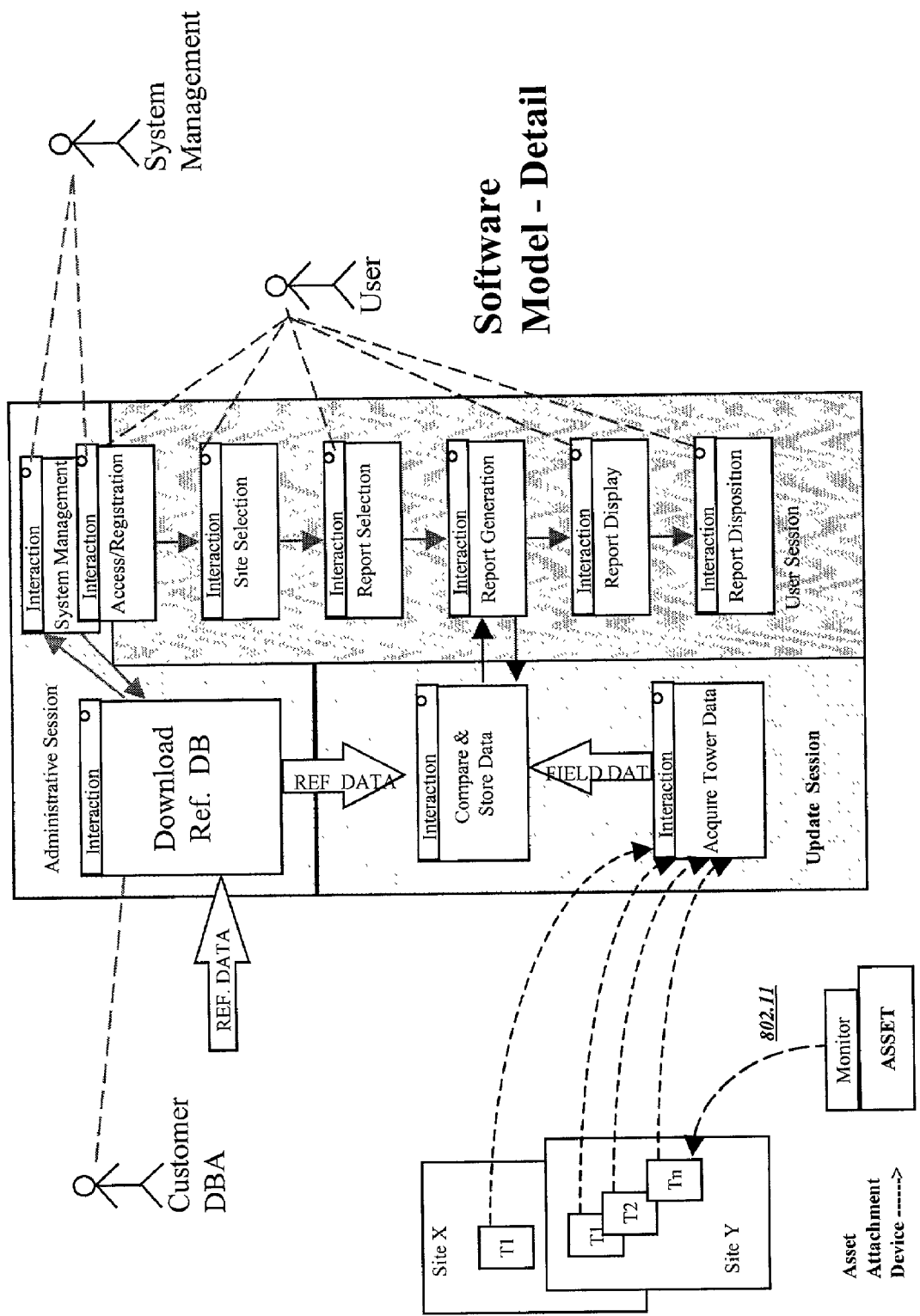
FIG. 11 further illustrates the software model overview for the central server.

The data management software is housed at the central server 16. The central server 16 is, for example, a PCAT computer or equipment. The central server 16 is in two-way communication with both the asset attachment device 10 and the user PC 12. FIG. 10 illustrates the software model overview for the central server. FIG. 11 further illustrates the software model overview for the central server.

The present invention performs asset management by giving the user asset information on a regular basis. The customer communicates with a central server via means such has telephone and the world wide web. The central server houses the application specific software to enable the user to manage assets. The central server communicates with the asset attachment device via means such as telephone and the world wide web. When a user accesses the system, the system sends back asset information such as the asset ID, location and status.

The asset attachment device may be configured to have a backup battery and it may be configured to transmit a separate set of signals if taken beyond a specific range.

The system of the present invention may also be configured to alignment any other system that the user may have such as burglar alarm systems to prevent theft of the physical asset.

While this invention has been described with specific embodiments, many alternatives, modifications and variations will be apparent to those skilled in the art in light of the foregoing description. Accordingly, it is intended to include all such alternatives, modifications and variations set forth within the sprint and scope of the description.

I claim:

1. A tracking device system consisting of:
   a physical asset;
   a transmitter, attached to the physical asset, for transmitting a first data signal;
   a communication means for receiving the first data signal and subsequently transmitting a second data signal via a world wide web connection, the second data signal comprising a location of the transmitter; and
   a receiving means for receiving the second data signal and for housing a software program for enabling a user to use the received location to track the physical asset,
   wherein the physical asset, the communication means and the receiving means are different devices, in continuous communication and track whether the physical asset is in its proper location, and
   the receiving means displays a status symbol corresponding to the location of the physical asset whereby if the status symbol is a first color the physical asset is not detected, if the status symbol is a second color the physical asset is detected but not detected in its proper location, and if the status symbol is a third color the physical asset is detected in its proper location.

2. The method of claim 1, wherein the outputting step comprises outputting a red status symbol if the physical asset is not detected.

3. The method of claim 1, wherein the outputting step comprises outputting a green status symbol if the physical asset is detected in its proper location.

4. The method of claim 1, wherein the outputting step comprises outputting a yellow status symbol if the physical asset is detected, but not detected in its proper location.

5. The tracking device system of claim 1, wherein the communication means comprises a central server.

6. The tracking device system of claim 1, wherein the receiving means comprises a personal computer.

7. The tracking device system of claim 1, wherein the receiving means generates, saves and prints reports based on the second data signal.

8. The tracking device system of claim 1, wherein the first color status symbol is a red status symbol.

9. The tracking device system of claim 1, wherein the third color status symbol is a green status symbol.

10. The tracking device system of claim 1, wherein the second color status symbol is a yellow status symbol.

11. The tracking device system of claim 1, wherein the communication means further comprises a database for storing information about the first data signal.

12. The tracking device system of claim 11, wherein the database is accessed by a user, the user having been granted exclusive access rights to the database and the user only gaining access by using a password or a personal identification number.

13. A method of tracking an asset comprising the steps of:
    forming a communications network by forming a world wide web connection between a personal computer and central server;
    transmitting a first data signal in real-time, via the communications network, from the personal computer to the central server to inquire the location of a physical asset;
    communicating with the physical asset from the central server via the communications network;
    tracking the physical asset by transmitting a second data signal over the communications network, said second data signal comprising a location of the physical asset;
    interrogating the second data signal to determine whether the physical asset is in its proper location and determine a status signal;
    storing the determined status signal in the central server; and
    outputting a status symbol representing the stored status signal,
    wherein the outputting step comprises outputting a first color status symbol if the physical asset is not detected, outputting a second color status symbol if the physical asset is detected in its proper location, and outputting a third color status symbol if the physical asset is detected, but not detected in its proper location.

14. The method of claim 13, further comprising the step of:
    manipulating the stored status signal by using the personal computer to generate, save and print reports.

15. A computer system, the system comprising:
    a computer network;
    at least one server in communication with the computer network;
    a storage device for storing information;
    at least one website linked to the at least one server through the computer network, wherein the website provides a user interface through which a user can access a tracking program; and
    a tracking module, the tracking module comprising of the tracking device system consisting of:
        a physical asset;
        a transmitter, attached to the physical asset, for transmitting a first data signal;
        a communication means for receiving the first data signal and subsequently transmitting a second data signal via a world wide web connection, the second data signal comprising a location of the transmitter; and
        a receiving means for receiving the second data signal and for housing a software program for enabling a user to use the received location to track the physical asset,
        wherein the physical asset, the communication means and the receiving means are different devices, in continuous communication and track whether the physical asset is in its proper location, and
        the receiving means displays a status symbol corresponding to the location of the physical asset where if the status symbol is red the physical asset is not detected, if the status symbol is yellow the physical asset is detected but not detected in its proper location, and if the status symbol is green the physical asset is detected in its proper location.

16. A computer readable storage medium containing a computer readable code for operating a computer to perform a method of tracking an asset, the method comprising the steps of:
    forming a communications network by forming a world wide web connection between a personal computer and central server;
    transmitting a first data signal in real-time, via the communications network, from the personal computer to the central server to inquire the location of a physical asset;
    communicating with the physical asset from the central server via the communications network;

tracking the physical asset by transmitting a second data signal over the communications network, the second data signal comprising a location of the physical asset;

interrogating the second data signal to determine whether the physical asset is in its proper location and determine a status signal;

storing the determined status signal in the central server; and outputting a status symbol representing the stored status signal, wherein the outputting step comprises outputting a red status symbol if the physical asset is not detected, the outputting step comprises outputting a green status symbol if the physical asset is detected in its proper location, and the outputting step comprises outputting a yellow status symbol if the physical asset is detected, but not detected in its proper location.

17. A computer program transmitted over a communication medium to a computer system, said computer system comprising memory, a storage device and a processor in communication with said memory and storage device, said computer program causing said processor to perform the acts of:

forming a communications network by forming a world wide web connection between a personal computer and central server;

transmitting a first data signal in real-time, via the communications network, from the personal computer to the central server to inquire the location of a physical asset;

communicating with the physical asset from the central server via the communications network;

tracking the physical asset by transmitting a second data signal over the communications network, the second data signal comprising a location of the physical asset;

interrogating the second data signal to determine whether the physical asset is in its proper location and determine a status signal;

storing the determined status signal in the central server; and outputting a status symbol representing the stored status signal, wherein the outputting step comprises outputting a first color status symbol if the physical asset is not detected, outputting a second color status symbol if the physical asset is detected in its proper location, and outputting a third color status symbol if the physical asset is detected, but not detected in its proper location.

18. The computer program of claim 17, wherein the communication medium is the internet.

* * * * *